United States Patent
Araki

(10) Patent No.: US 10,394,450 B2
(45) Date of Patent: Aug. 27, 2019

(54) APPARATUS, METHOD, AND PROGRAM PRODUCT FOR GROUPING DATA

(71) Applicant: International Business Machines Corporation, Armonk, NY (US)

(72) Inventor: Hiroshi Araki, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 179 days.

(21) Appl. No.: 15/359,059

(22) Filed: Nov. 22, 2016

(65) Prior Publication Data
US 2018/0143764 A1    May 24, 2018

(51) Int. Cl.
*G06F 3/06* (2006.01)
*G06F 7/02* (2006.01)

(52) U.S. Cl.
CPC ........ *G06F 3/0604* (2013.01); *G06F 3/0649* (2013.01); *G06F 3/0685* (2013.01); *G06F 7/02* (2013.01)

(58) Field of Classification Search
CPC .... G06F 3/0604; G06F 3/0643; G06F 3/0647; G06F 3/065; G06F 3/067; G06F 3/0682; G06F 7/02
See application file for complete search history.

(56) References Cited

U.S. PATENT DOCUMENTS

| | | | | |
|---|---|---|---|---|
| 2009/0077502 A1* | 3/2009 | Bird | | G06F 9/453 |
| | | | | 715/853 |
| 2010/0306186 A1* | 12/2010 | Tobita | | G06F 3/061 |
| | | | | 707/711 |
| 2012/0151133 A1* | 6/2012 | Iwasaki | | G06F 3/0619 |
| | | | | 711/113 |
| 2013/0159643 A1* | 6/2013 | Katagiri | | G06F 21/64 |
| | | | | 711/156 |
| 2013/0282830 A1 | 10/2013 | Besen et al. | | |
| 2013/0290386 A1* | 10/2013 | Suzuki | | G06F 3/061 |
| | | | | 707/822 |
| 2015/0208446 A1* | 7/2015 | Yeoum | | H04L 65/1046 |
| | | | | 370/329 |

(Continued)

FOREIGN PATENT DOCUMENTS

| EP | 1152352 B1 | 11/2001 |
|---|---|---|
| JP | 2001195397 A | 7/2001 |

(Continued)

OTHER PUBLICATIONS

Ryo Ohsawa et al., "Information Recall Support Tool Based on User Operation History", Faculty of Environmental Information, Keio University, Graduate School of Media and Governance, Keio University, known about as early as Sep. 7, 2016 and downloaded on Sep. 7, 2016, 7 pages.

(Continued)

*Primary Examiner* — Nanci N Wong
(74) *Attorney, Agent, or Firm* — Kunzler Bean & Adamson

(57) ABSTRACT

An apparatus, method, system, and program product are disclosed for grouping data. One method includes detecting a relationship between a first file and a second file. The method includes calculating a degree of relevance between the first file and the second file based on the relationship. The method also includes grouping the first file and the second file in response to the degree of relevance being greater than a threshold degree of relevance.

18 Claims, 5 Drawing Sheets

(56) References Cited

U.S. PATENT DOCUMENTS

| | | |
|---|---|---|
| 2015/0339172 A1 | 11/2015 | Jung |
| 2016/0088080 A1* | 3/2016 | Bare, II .............. H04L 67/1095 709/217 |
| 2016/0225403 A1* | 8/2016 | Hostetter ........... G11B 20/0021 |
| 2017/0046074 A1* | 2/2017 | Wang .................... G06F 3/0608 |

FOREIGN PATENT DOCUMENTS

| | | |
|---|---|---|
| JP | 2005032129 A | 2/2005 |
| JP | 2007183864 A | 7/2007 |
| JP | 2015228140 A | 12/2015 |
| WO | 2014/083598 A1 | 6/2014 |

OTHER PUBLICATIONS

Steve Langer "Challenges for Data Storage in Medical Imaging Research", Journal of Digital Imaging, Research Gate, Apr. 2011, 6 pages.

\* cited by examiner

APPARATUS, METHOD, AND PROGRAM PRODUCT FOR GROUPING DATA

FIELD

The subject matter disclosed herein relates to data and more particularly relates to grouping data.

BACKGROUND

Data replication or data backups may be used to replicate data such that a backup of the data is maintained to aid in data recovery.

BRIEF SUMMARY

An apparatus for grouping data is disclosed. A method and computer program product also perform the functions of the apparatus. In one embodiment, an apparatus includes a relationship module that detects a relationship between a first file and a second file. The apparatus, in a further embodiment, includes a relevance module that calculates a degree of relevance between the first file and the second file based on the relationship. In various embodiments, the apparatus includes a linking module that groups the first file and the second file in response to the degree of relevance being greater than a threshold degree of relevance. In certain embodiments, at least a portion of the relationship module, the relevance module, and the linking module includes one or more of hardware and executable code. The executable code may be stored on one or more computer readable storage media.

A method for grouping data, in one embodiment, includes detecting a relationship between a first file and a second file. In various embodiments, the method includes calculating a degree of relevance between the first file and the second file based on the relationship. The method may also include grouping the first file and the second file in response to the degree of relevance being greater than a threshold degree of relevance.

In one embodiment, a computer program product for grouping data includes a computer readable storage medium having program instructions embodied therewith. The program instructions, in some embodiments, are executable by a processor to cause the processor to detect a relationship between a first file and a second file. The program instructions, in one embodiment, are executable by a processor to cause the processor to calculate a degree of relevance between the first file and the second file based on the relationship. In a further embodiment, the program instructions are executable by a processor to cause the processor to group the first file and the second file in response to the degree of relevance being greater than a threshold degree of relevance.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
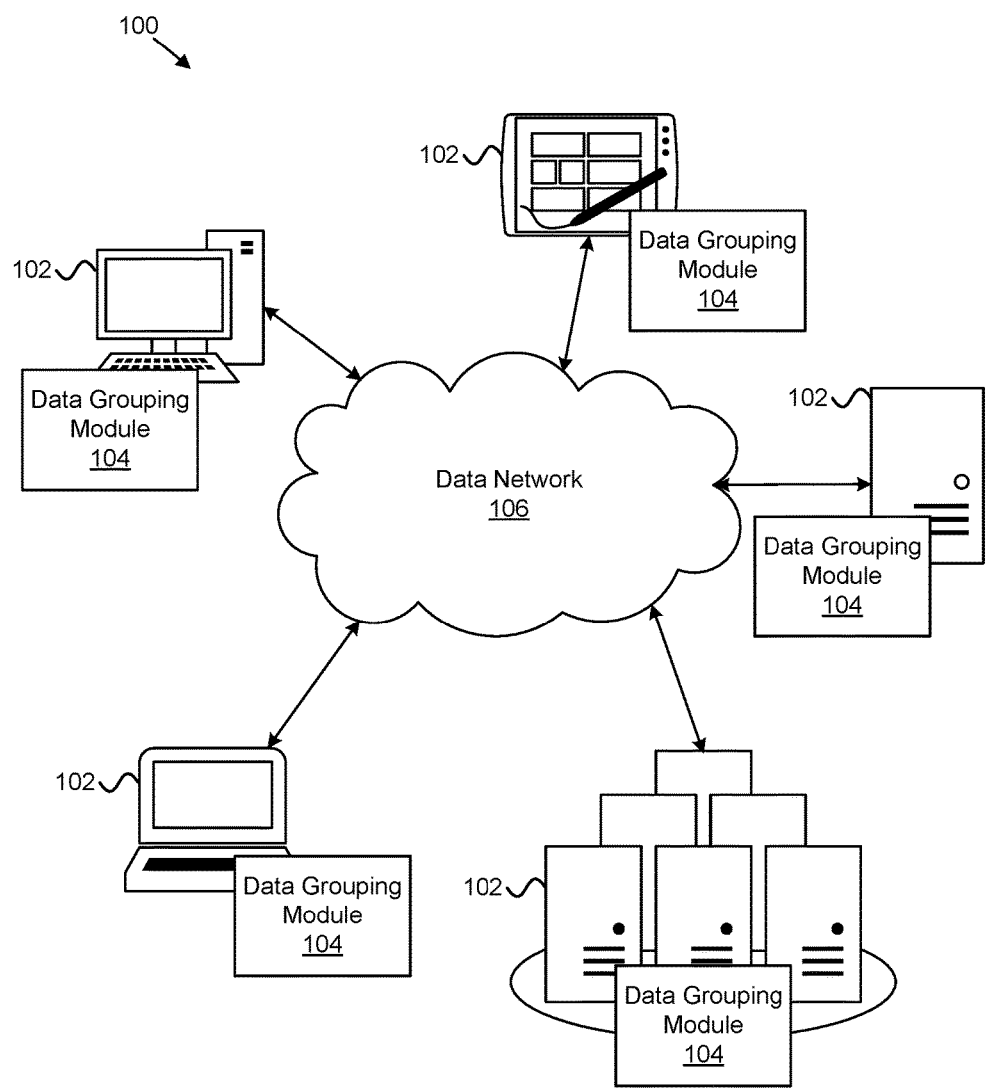
FIG. 1 is a schematic block diagram illustrating one embodiment of a system for grouping data in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for grouping data. In one embodiment, the system 100 includes information handling devices 102, data grouping modules 104, and data networks 106. Even though a particular number of information handling devices 102, data grouping modules 104, and data networks 106 are depicted in the system 100 of FIG. 1, one of skill in the art will recognize that any number or configuration of information handling devices 102, data grouping modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous access to stored data. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, tape readers, or the like. In some embodiments, the information handling devices 102 are in communication via one or more data networks 106, described below.

In one embodiment, the data grouping module 104 detects a relationship between a first file and a second file. The data grouping module 104 calculates a degree of relevance between the first file and the second file based on the relationship. The data grouping module 104 may group the first file and the second file in response to the degree of relevance being greater than a threshold degree of relevance. In this manner, the data grouping module 104 may facilitate efficient access to files that have been used together. Ultimately, this may facilitate providing faster access for applications to files stored on a tape cartridge and/or reduced resource usage (e.g., time, processor, memory, data bandwidth, etc.).

As may be appreciated, the data grouping module 104 may be used in any suitable data replication system 100. In certain embodiments, as described below with reference to FIGS. 2 and 3, the data grouping module 104 includes multiple modules that perform the operations of the data grouping module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
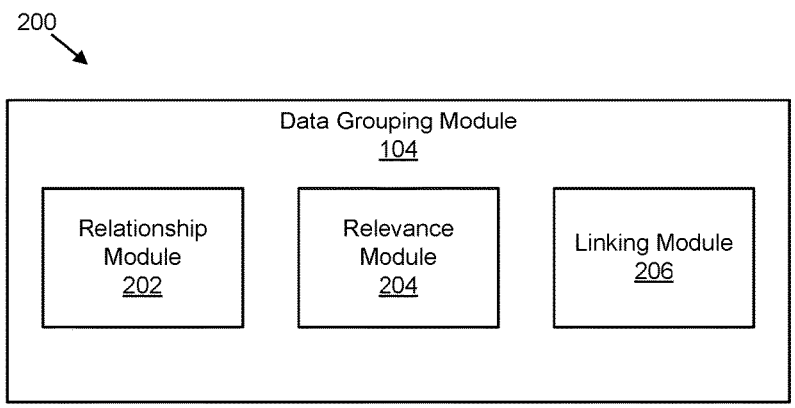
FIG. 2 is a schematic block diagram illustrating one embodiment of a module for grouping data in accordance with one embodiment of the present invention.

FIG. 2 is a schematic block diagram illustrating one embodiment of a module 200 for grouping data. In one embodiment, the module 200 includes an embodiment of a data grouping module 104. The data grouping module 104, in various embodiments, includes one or more of a relationship module 202, a relevance module 204, and a linking module 206, which are described in more detail below.

In one embodiment, the relationship module 202 detects a relationship between a first file and a second file. In certain embodiments, the first file and/or the second file may be stored in a storage network remove from a device using the first file and/or the second file (e.g., cloud storage such as iCloud Drive®, Google Drive™, Dropbox™ OneDrive®, or Evernote®; enterprise storage; etc.). In some embodiments, the relationship module 202 detects the relationship between the first file and the second file in response to initiating migration of the first file. For example, migration of the first file may be initiated, then as part of the migration process, the relationship between the first file and the second file may be detected. In certain embodiments, the relationship between the first file and the second file is associated with performance of a task. For example, the relationship between the first file and the second file may be associated with files used together as part of a presentation, files accessed together for updating one or more files, files in which one file is the output of another file, or the like. As used herein, a "relationship" between two or more files may refer to the two or more files being used together, the two or more files being accessed during a time period, the two or more files having a first file that is a derivative of a second file, the two or more files having a first file that is an output (or result) of a second file, and so forth.

In certain embodiments, the relationship module 202 detects the relationship between the first file and the second file by: classifying the first file as a reference file, wherein the reference file is associated with a task, and the reference file is substantially unchanged (e.g., a majority of the file is unchanged, 75% of the file is unchanged, 90% of the file is unchanged) by the association with the task; classifying the second file as an output file, wherein the output file is associated with the task, and the output file is substantially changed (e.g., a majority of the file is changed, 25% of the file is changed, 10% of the file is changed) by the association with the task; and detecting the relationship based on the classification of the first and second files.

In some embodiments, the relationship module 202 detects the relationship between the first file and the second file by: recording a first history of access to the first file (e.g., creating a first log corresponding to time periods during which the first file is accessed); recording a second history of access to the second file (e.g., creating a second log corresponding to time periods during which the second file is accessed); and detecting the relationship based on an overlap in time between the first history and the second history (e.g., determining that the first file is accessed during a same time period as the second file).

In various embodiments, the relationship module 202 detects the relationship between the first file and the second file by: recording a first history of access to the first file (e.g., creating a first log corresponding to time periods during which the first file is accessed); recording a second history of access to the second file (e.g., creating a second log corresponding to time periods during which the second file is accessed); and detecting the relationship based on the first history and the second history indicating that the second file is an output file corresponding to the first file (e.g., the second history indicates creation of the second file, such as by a first time that the second file is accessed, and creation of the second file occurs during a time period of access of the first file).

The relevance module 204, in one embodiment, calculates a degree of relevance between the first file and the second file based on the relationship. The degree of relevance may indicate how closely the first file is related to the second file. In one embodiment, a degree of relevance may be high for files used as a reference for a presentation. In another embodiment, a degree of relevance may be high for a second file that may be read in the near future after a first file has been read. As may be appreciated, if a degree of relevance is known for files related to a first file, in response to accessing the first file, related files may be prefetched and cached for use. Accordingly, files with a high degree of relevance may be stored on a single storage medium (e.g., the same tape cartridge in a hierarchical storage management ("HSM") environment).

In some embodiments, the degree of relevance may be based on whether one or more users perform a certain task in an intensive manner for a predetermined period of time and/or a period of time during which a user views files together. In one embodiment, if a user views two files together in a short period of time, the degree of relevance between the two files may be high.

The following example further illustrates calculating a degree of relevance. In this example a salesperson of a securities company views and creates materials using an information handling device 102 and visits a client. For example, assume that the salesperson created explanatory materials for the client in the morning of a certain day. Therefore, the salesperson may have referred to materials such as account information of the client, a transaction record, market information, and financial instruments that the client has been selling. Moreover, in the afternoon of a next day after the certain day of creation of the materials, the salesperson may visit the client and let the client see the materials created the previous day along with the information that the salesperson referred to in the creation of the materials. Further, when the visit is over, the salesperson may create a new visit record and look back on the visit of that day while viewing the materials and create a personal memorandum that would be helpful in the sales activities for other clients.

In the above example, the salesperson refers to and creates multiple files, which may be classified into two types of files, i.e., the files that were referred to, and the files that were newly created. The files that were referred to may include: account information of the clients; a transaction record of the transactions of the clients; market information; financial instruments information relating to financial instruments for sale; and explanatory materials. The files that were created may include: explanatory materials; a visit record; and a personal memorandum. In this example, the explanatory materials may not only be the materials that have been created but also the files that have subsequently been referred to.

In this example, we may assume that the salesperson transferred the files from the information handling device 102 to a network attached storage ("NAS") which has a disk-plus-tape HSM configuration, and that a time when the above files are to be migrated to a tape cartridge has arrived. Because of a high degree of relevance between the files (e.g., the files were accessed during the same period of time), the files may be stored together on one tape cartridge. However, there may be a difference in the degree of relevance of the files depending on the two types of classification.

In general, when a document B was created while a document A was referred to, then dependence of the document B on the document A is thought to be larger than the dependence of the document A on the document B. For example, when the document B is created, what is already described in the document A may not be repeatedly stated in the document B, but it may be said that the information may be necessary or significantly useful for those who have never read the document A. Meanwhile, as the document A was not created on the basis of the document B, it will not follow that it is necessary to read the document B when reading the document A. In other words, it may be said that one may determine a direction in the relevance between files. For example, if there are two files f1 and f2 and the file relevance degree R of the file f2 for the file f1 is given as R(f1, f2), then it does not necessarily follow that R(f1, f2) and R(f2, f1) are always equal to each other. Also, this difference becomes explicit when a certain file is created while another file is referred to for creation of the certain file.

Indeed, when the direction of the relevance between files becomes known, more value may be provided than in a case where it remains unknown. For example, when it is necessary to first migrate the document B prior to migration of the document A, the document A is strongly relevant to the document B even when the document A does not satisfy the condition for the migration. Accordingly, if the documents A and B are stored in the same tape cartridge, the document A may be read without penalty when the document B is subsequently read. In contrast, when the document A is to be migrated before the document B, there may be less advantage in migrating the document B along with the document A.

In various embodiments, the relevance module 204 calculates the degree of relevance as a directional degree of relevance. In one embodiment, a non-directional degree of relevance may refer to R where R(a, b)=R(b, a) always holds with regard to two files a and b. In another embodiment, a directional degree of relevance may refer to DR where DR(a, b) !=DR(b, a).

As used herein, a degree of relevance between two files may refer to a degree of a first file serving as a reference for a second file when the first file is read along with the second file. Moreover, the degree of relevance between the two files may include a relationship between two files that can be quantified.

In the example that follows, a task may refer to creating and/or modifying one or more files by a user using an information handling device 102 and referring to one or more files; a reference file may refer to a file that was referred to during a certain task and may be unchanged before and after the certain task or only slightly modified by the certain task; and an output file may refer to a file that is created by a certain task or a file that results from significant modification made to an existing file by the certain task.

Further, directed file relevance degree DR may refer to, with regard to certain two files f1, f2, a directed file relevance degree DR(f1, f2) is the degree to which a user reading the file f1 feels that the file f2 serves as a reference in relation to or has a certain association with the file f1. With regard to the files used in the task, they generally satisfy DR(f1, f2) !=DR(f2, f1).

In certain embodiments, to determine a relevance degree of files used in a certain task, the weighting of a degree of relevance may be changed in accordance with the combination of file types (e.g., whether files are reference files or output files).

Specifically, when obtaining the directed file relevance degree DR(a, b) for files a and b, four types of combination may exist for these files a, b. Here, for example, assuming a use case of general creation of power point materials, the following assumption is possible for the degree to which the file b serves as a reference when a certain user uses the file a.

First combination: a=Output file, b=Output file. Because these files are those that were created based on a same reference file (in this example), they may be complementary to each other and it is thought that the output file b is likely to serve as a reference to the output file a to some extent.

Second combination: a=Output file, b=Reference file. Because the output file a was created by referring to the reference file b, the reference file b is likely to serves as a reference to the output file a to a considerable extent.

Third combination: a=Reference file, b=Output file. Although it may depend on a specific cases, in general the reference file a is not necessarily created on the premise of the output file b, therefore the content of the reference file a is likely to be self-contained, and the output file b is less likely to serve as a reference for the reference file a.

Fourth combination: a=Reference file, b=Reference file. In contrast to the other cases, these files may not be related to each other and it is probable that the reference file b never serves as a reference for reference file a.

Based on these combinations, when obtaining a directional degree of relevance, a larger coefficient may be given to a case in which the file b is more likely to serve as a reference to the file a. By virtue of this, it is possible to provide fine weighting compared with non-directional degree of relevance that only involves two existing combinations.

In some embodiments, a task may be considered to be limited to a certain time period T. For example, the time period T may be specified as 15 minutes. The time period T may be changed to accurately group files corresponding to the task.

The linking module 206, in one embodiment, groups the first file and the second file in response to the degree of relevance being greater than a threshold degree of relevance. For example, the linking module 206 may group the first file and the second file together such that they are stored together on a tape cartridge.

The data grouping module 104, in certain embodiments, detects corresponding relationships between the first file and each file of multiple files; calculates corresponding degrees of relevance between the first file and each file of the multiple files based on the corresponding relationships; and groups the first file and each file of the multiple files having a corresponding degree of relevance greater than the threshold degree of relevance.

In certain embodiments, at least a portion of the relationship module 202, the relevance module 204, and the linking module 206 include one or more of hardware and executable code. In such embodiments, the executable code may be stored on one or more computer readable storage media.

Figure 3:
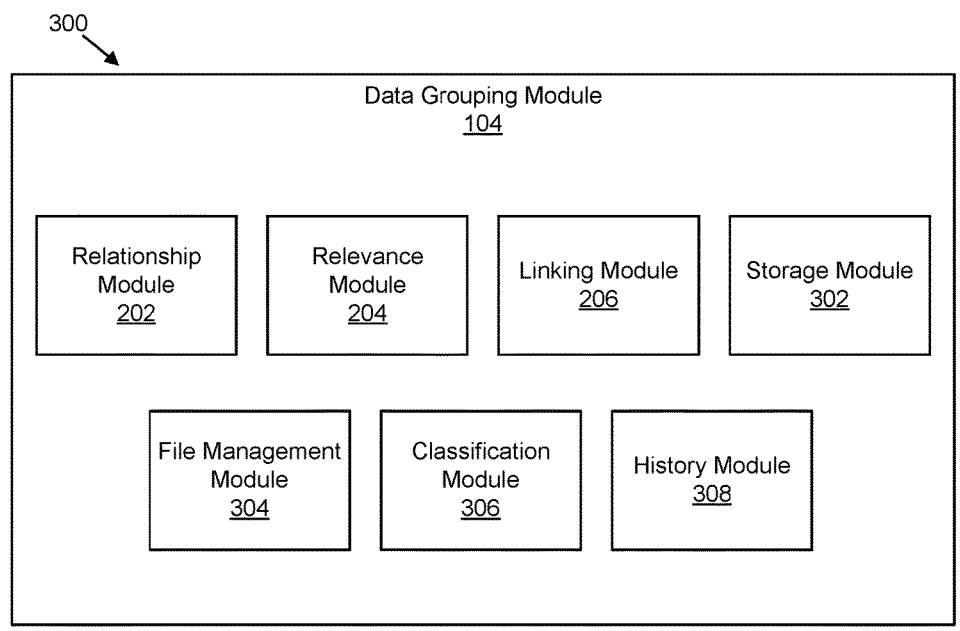
FIG. 3 is a schematic block diagram illustrating one embodiment of another module for grouping data in accordance with one embodiment of the present invention.

FIG. 3 is a schematic block diagram illustrating one embodiment of another module 300 for grouping data. In one embodiment, the module 300 includes an embodiment of a data grouping module 104. The data grouping module 104, in various embodiments, includes one or more of a relationship module 202, a relevance module 204, and a linking module 206, which may be substantially similar to the relationship module 202, the relevance module 204, and the linking module 206 described above. The data grouping module 104 may also include one or more of a storage module 302, a file management module 304, a classification module 306, and a history module 308, which are described in more detail below.

In one embodiment, the storage module 302 stores files (e.g., a first file and a second file) on a tape cartridge. The storage module 302 may store the files together on the tape cartridge based on the files being grouped together by the linking module 206.

The file management module 304, in certain embodiments, facilitates migrating and/or storing files on tape cartridges. For example, in one embodiment, the file management module 304 may facilitate migration of the first file to a tape cartridge, and copying the second file to the tape cartridge. As another example, the file management module 304 may facilitate copying the first file to a tape cartridge, and migrating the second file to the tape cartridge. As a further example, the file management module 304 may facilitate migrating the first file to a tape cartridge, and migrating the second file to the tape cartridge. As yet another example, the file management module 304 may facilitate copying the first file to a tape cartridge, and copying the second file to the tape cartridge.

In some embodiments, the classification module 306 classifies files as different types of files, such as reference files and/or output files. The relationship may be detected by the relationship module 202 based on the classification of the files. In one embodiment, the classification module 306 classifies the first file as a reference file and classifies the second file as an output file. In another embodiment, the classification module 306 classifies the first file as an output file and classifies the second file as a reference file. In a further embodiment, the classification module 306 classifies the first file as an output file and classifies the second file as an output file. In yet another embodiment, the classification module 306 classifies the first file as a reference file and classifies the second file as a reference file.

In various embodiments, the history module 308 records a history of access to files. For example, the history module 308 may record a timestamp (e.g., date and time) corresponding to a file being created, a file being opened, a file being closed, a file being deleted, and so forth. The relationship may be detected by the relationship module 202 based on the history of access to the files. In one embodiment, the history module 308 may record a first history of access to a first file and records a second history of access to a second file.

Figure 4:
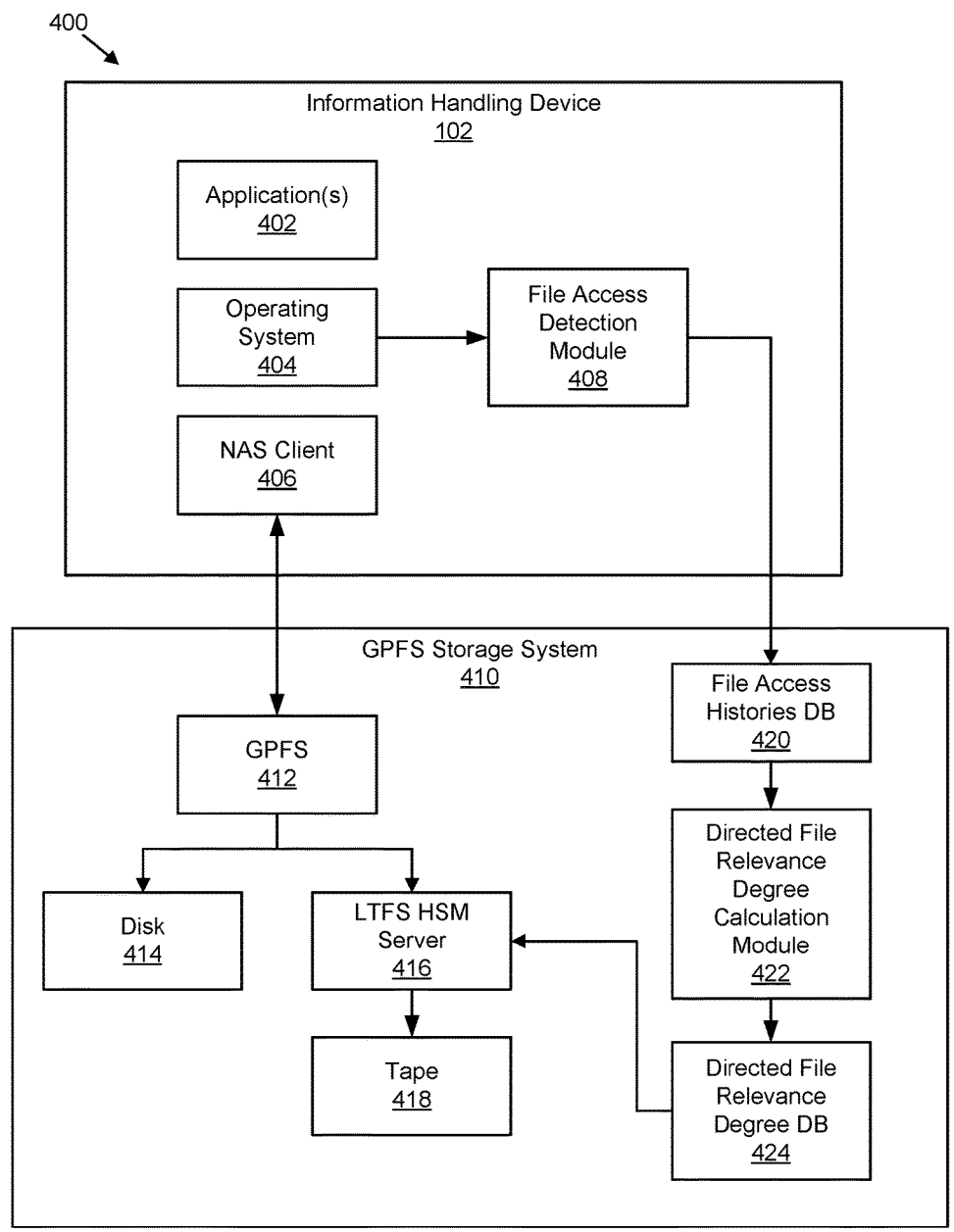
FIG. 4 is a schematic block diagram illustrating another embodiment of a system for grouping data in accordance with one embodiment of the present invention.

FIG. 4 is a schematic flow chart diagram illustrating another embodiment of a system 400 for grouping data. The system 400 includes an information handling device 102, which may be similar to the information handling device 102 described in relation to FIG. 1. Moreover, the information handling device 102 includes application(s) 402, an operating system 404, a network attached storage ("NAS") client 406, and a file access detection module 408. The NAS client 406 facilitates accessing and/or storing files remote from the information handling device 102.

The file access detection module 408 facilitates gathering data corresponding to accessing files (e.g., file access histories). In one embodiment, the file access detection module 408 modifies the operating system 404 and/or application(s) 402 using various techniques to gather an identifier of a file that a user is using (e.g., viewing and/or writing), creation of the file, modification of the file, a start time at which use of the file started, and/or an end time at which use of the file ended.

In some embodiments, the file access detection module 408 may determine whether a file is a reference file or an output file using the following two techniques:

A file modification time ("mtime") of a first file may be stored at a first time and compared with the mtime of the first file at a second time. When the mtime has been changed, then the newly opened file is regarded as an output file. If not, then the newly opened file is regarded as a reference file.

Hooking is made to the file input/output write command by data management application protocol interface ("DMAPI") or the like, and a file for which the write occurred is regarded as an output file while a file for which the write did not occur is regarded as a reference file.

One or more of three pieces of information, i.e., the use start time of the file, the identifier of the file, and whether the file is a reference file or an output file, which may be obtained by this file access detection module 408, may be referred to herein as a file access history.

Both of the NAS client 406 and the file access detection module 408 communicate with a general parallel file system ("GPFS") storage system 410 to facilitate access and/or storage of files. The GPFS storage system 410 includes a GPFS 412 that facilitates storage of files on a disk 414 for regular use and facilitates migration of files via a linear tape file system ("LTFS") HSM server 416 to a tape 418 (e.g., tape cartridge). The LTFS HSM server 416 may migrate files from the disk 414 to the tape 418 after files have not been accessed for a predetermined period of time.

The GPFS storage system 410 also includes a file access histories database ("DB") 420 used to store files access histories gathered by the file access detection module 408. The file access histories may be stored based on a predetermined timing. Moreover, the file access histories may be deleted from the file access histories DB 420 based on a predetermined timing and/or using a first-in-first-out ("FIFO") timing. In one embodiment, the file access histories DB 420 may include information such as the information illustrated in Table 1.

TABLE 1

| File Access History DB | | |
|---|---|---|
| Reference or Output | File Identifier | Use Start Time |
| Reference file | /dir1/file1 | October 25, 2016 10:00 |
| Reference file | /dir2/file2 | October 25, 2016 13:00 |
| Output file | /dir2/file3 | October 25, 2016 14:00 |

The GPFS storage system 410 includes a directed file relevance degree calculation module 422 that calculates a directed degree of relevance (e.g., directional degree of relevance) similar to the calculation performed by the relevance module 204 and/or stores the degree of relevance in a directed file relevance degree DB 424. In some embodiments, the relevance module 204 may calculate the degree of relevance similar to the directed file relevance degree calculation module 422.

The directed file relevance degree calculation module 422 may calculate the directed file relevance degree with weighting made in accordance with the combination of the file types of the input files, a total of four patterns. For example, the following expression may be used. Let $a_i$ is the ith use start time for the file a.

$$DR_{ab} = \frac{\sum_{k=1}^{n} \min(|a_k - b_1|, |a_k - b|)}{n} \times C$$

where:

$$C = \begin{cases} 2 & (a \text{ represents an output file and } b \text{ represents a reference file}) \\ 1 & (a \text{ represents an output file and } b \text{ represents an output file}) \\ 0.5 & (a \text{ represents a reference file and } b \text{ represents an output file}) \\ 0.1 & (a \text{ represents a reference file and } b \text{ represents a reference file}) \end{cases}$$

In some embodiments, C may be defined such that it takes a larger value for the file b that is more likely to serve as a reference when the file a is used in the future depending on the combination of the file types of the files a and b. Accordingly, it is possible to obtain a practical relevance degree of a file. It should be noted that the value of C may be changed at any timing after the start of operation.

In certain embodiments, the relevance of files may not be frequently changed, so the calculation of the file relevance degree may be executed while a system is in an idle state at appropriate intervals, for example, once a week. The directed file relevance may be used by the LTF S HSM server 416 for grouping files for migration and/or storage on the tape 418.

The directed file relevance degree DB 424 stores the directed file relevance of individual files. For example, in one embodiment, the directed file relevance degree DB 424 may be implemented in accordance with a table format as illustrated in Table 2.

TABLE 2

Directed Relevance Degree DB

|            | /dir1/file1 | /dir2/file2 | /dir3/file3 |
|------------|-------------|-------------|-------------|
| /dir1/file1 | N/A         | 10          | 20          |
| /dir2/file2 | 40          | N/A         | 1.5         |
| /dir3/file3 | 5           | 30          | N/A         |

Figure 5:
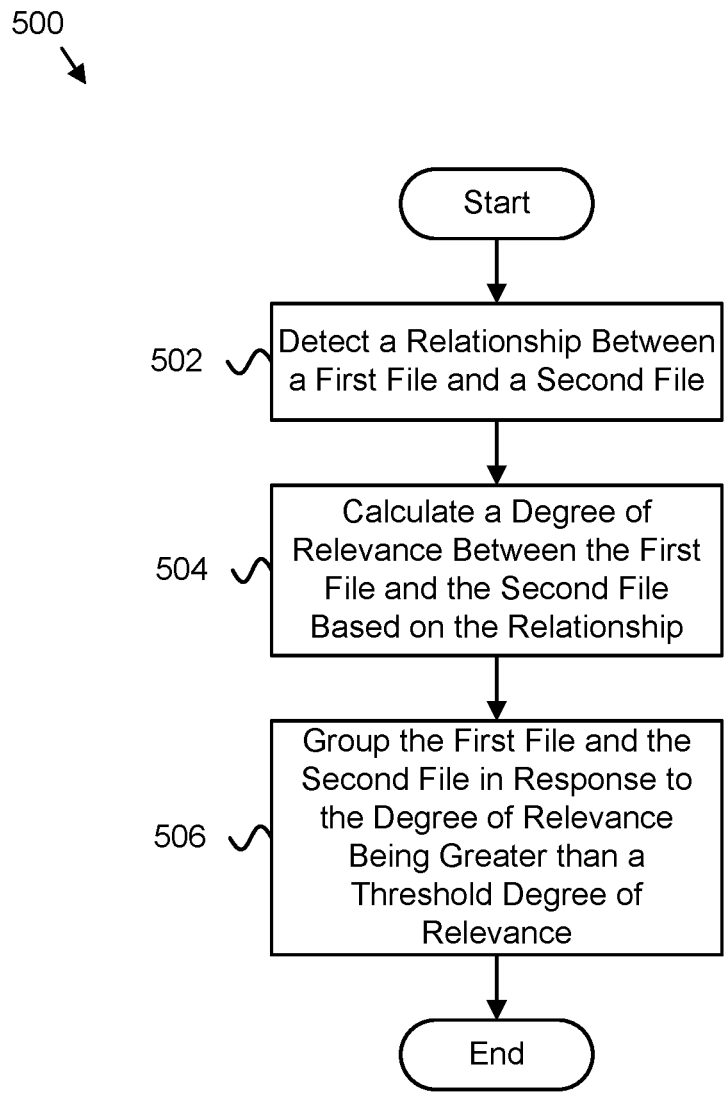
FIG. 5 is a schematic flow chart diagram illustrating one embodiment of a method for grouping data in accordance with one embodiment of the present invention.

FIG. 5 is a schematic flow chart diagram illustrating one embodiment of a method 500 for grouping data. In one embodiment, the method 500 begins and detects 502 a relationship between a first file and a second file. In certain embodiments, the detecting 502 the relationship between the first file and the second file includes: classifying the first file as a reference file, wherein the reference file is associated with a task, and the reference file is substantially unchanged by the association with the task; classifying the second file as an output file, wherein the output file is associated with the task, and the output file is substantially changed by the association with the task; and detecting the relationship based on the classification of the first and second files.

In some embodiments, detecting 502 the relationship between the first file and the second file includes: recording a first history of access to the first file; recording a second history of access to the second file; and detecting the relationship based on an overlap in time between the first history and the second history. In various embodiments, detecting 502 the relationship between the first file and the second file includes: recording a first history of access to the first file; recording a second history of access to the second file; and detecting the relationship based on the first history and the second history indicating that the second file is an output file corresponding to the first file.

The method 500 calculates 504 a degree of relevance between the first file and the second file based on the relationship. In some embodiments, the degree of relevance is a directional degree of relevance. The method 500 also groups 506 the first file and the second file in response to the degree of relevance being greater than a threshold degree of relevance.

In certain embodiments, the method 500 includes storing the first file and the second file on a tape cartridge. In such embodiments, the tape cartridge may be part of a HSM system. In some embodiments, the method 500 includes migrating the first file to a tape cartridge, and copying the second file to the tape cartridge.

Figure 6:
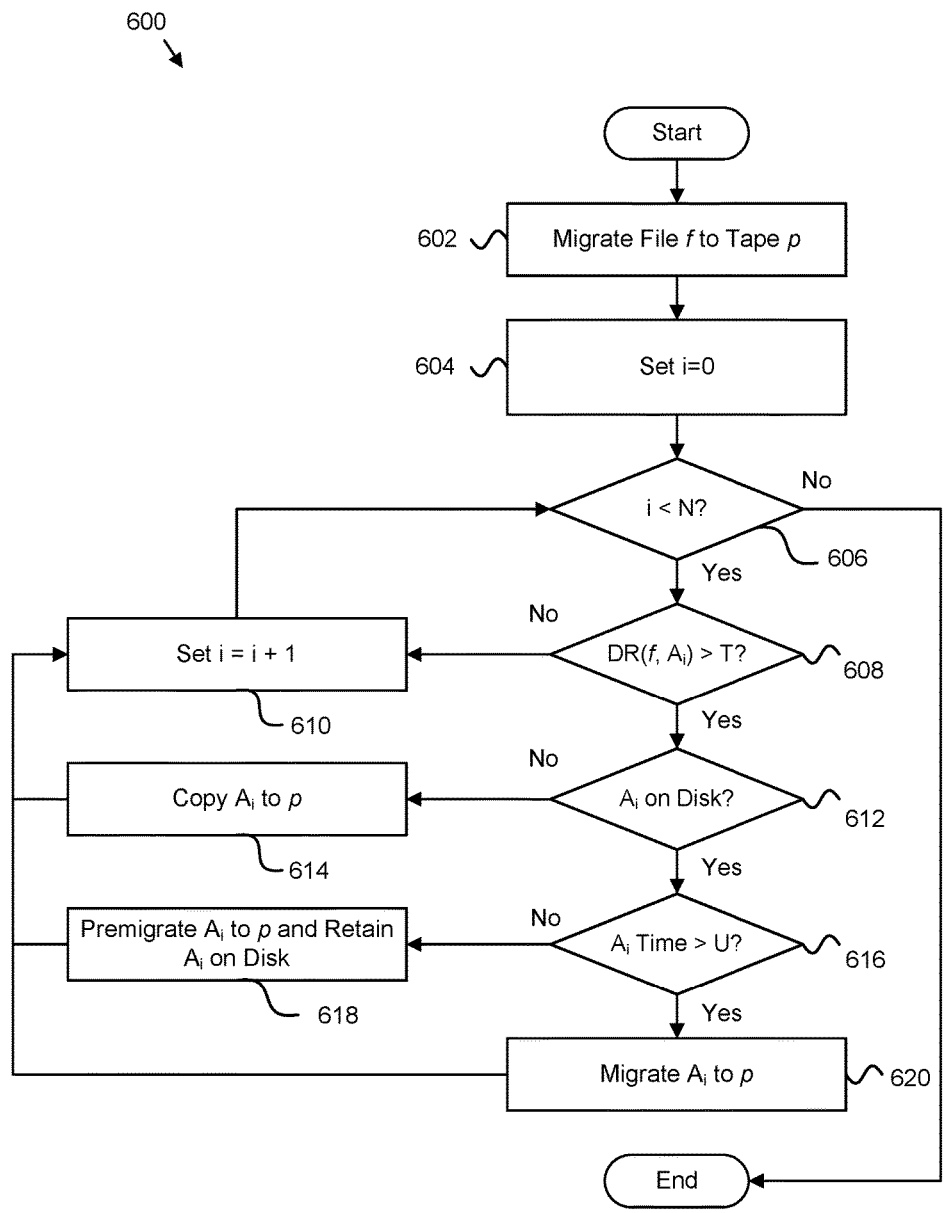
FIG. 6 is a schematic flow chart diagram illustrating another embodiment of a method for grouping data in accordance with one embodiment of the present invention.

FIG. 6 is a schematic flow chart diagram illustrating another embodiment of a method 600 for grouping data. The method 600 starts and determines to migrate 602 file f to tape p. The method 600 sets 604 i=0, where i represents a selected file out of files that have a relationship to file f. Then, the method 600 determines 606 whether i<N, where N represents the total number of files that have a relationship with file f. If i is not<N, the method 600 ends.

If i is <N, the method 600 determines 608 whether the directional relationship DR(f, $A_i$)>T, where T is a predetermined threshold. If the directional relationship DR is not >T, the method 600 sets 610 i=i+1, then returns to determining 606 whether i<N. If the directional relationship DR is>T, the method 600 determines 612 whether $A_i$ is on a disk of a GPFS. If $A_i$ is not on a disk of the GPFS, the method 600 copies 614 $A_i$ to the tape p, then returns to setting 610 i=i+1.

If $A_i$ is on a disk of the GPFS, the method 600 determines 616 whether it is time to migrate $A_i$ (e.g., (current time)−(last time of access to $A_i$)>U, where U is a threshold time for migrating a file. If it is not time to migrate $A_i$, the method 600 premigrates 618 $A_i$ top and retains $A_i$ on the disk, then returns to setting 610 i=i+1. If it is time to migrate $A_i$, the method 600 migrates 620 $A_i$ top, then returns to setting 610 i=i+1.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for grouping data, comprising:
   detecting a relationship between a first file and a second file;
   calculating a degree of relevance between the first file and the second file based on the relationship;
   grouping the first file and the second file in response to the degree of relevance being greater than a threshold degree of relevance; and
   storing the first file and the second file on a tape cartridge, wherein storing the first file and the second file on the tape cartridge comprises:
   determining that the first file satisfies a condition for migration to the tape cartridge;
   determining that the first file is grouped with the second file in response to the degree of relevance being greater than the threshold degree of relevance; and
   storing the first file and the second file on the tape cartridge in response to determining that the first file is grouped with the second file, wherein the second file does not satisfy the condition for migration to the tape cartridge.

2. The method of claim 1, wherein detecting the relationship between the first file and the second file occurs in response to initiating migration of the first file.

3. The method of claim 1, wherein the relationship between the first file and the second file is associated with performance of a task.

4. The method of claim 1, further comprising:
   detecting corresponding relationships between the first file and each file of a plurality of files;
   calculating corresponding degrees of relevance between the first file and each file of the plurality of files based on the corresponding relationships; and
   grouping the first file and each file of the plurality of files having a corresponding degree of relevance greater than the threshold degree of relevance.

5. The method of claim 1, wherein the degree of relevance is a directional degree of relevance.

6. The method of claim 1, wherein the tape cartridge is part of a hierarchical storage management ("HSM") system.

7. The method of claim 1, wherein detecting the relationship between the first file and the second file comprises:
   classifying the first file as a reference file, wherein the reference file is associated with a task, and the reference file is substantially unchanged by the association with the task;
   classifying the second file as an output file, wherein the output file is associated with the task, and the output file is substantially changed by the association with the task; and
   detecting the relationship based on the classification of the first and second files.

8. The method of claim 1, wherein detecting the relationship between the first file and the second file comprises:
   recording a first history of access to the first file;

recording a second history of access to the second file; and detecting the relationship based on an overlap in time between the first history and the second history.

9. The method of claim 1, wherein detecting the relationship between the first file and the second file comprises:

recording a first history of access to the first file;

recording a second history of access to the second file; and detecting the relationship based on the first history and the second history indicating that the second file is an output file corresponding to the first file.

10. The method of claim 1, further comprising migrating the first file to a tape cartridge, and copying the second file to the tape cartridge.

11. An apparatus comprising:

a relationship module that detects a relationship between a first file and a second file;

a relevance module that calculates a degree of relevance between the first file and the second file based on the relationship;

a linking module that groups the first file and the second file in response to the degree of relevance being greater than a threshold degree of relevance; and a storage module that stores the first file and the second file on a tape cartridge in response to the linking module grouping the first file and the second file, wherein storing the first file and the second file on the tape cartridge comprises:

determining that the first file satisfies a condition for migration to the tape cartridge;

determining that the first file is grouped with the second file in response to the degree of relevance being greater than the threshold degree of relevance; and storing the first file and the second file on the tape cartridge in response to determining that the first file is grouped with the second file, wherein the second file does not satisfy the condition for migration to the tape cartridge;

wherein at least a portion of the relationship module, the relevance module, and the linking module comprises one or more of hardware and executable code, the executable code being stored on one or more computer readable storage media.

12. The apparatus of claim 1, comprising a file management module that facilitates migration of the first file to a tape cartridge, and copying the second file to the tape cartridge.

13. The apparatus of claim 1, comprising a classification module that classifies the first file as a reference file and classifies the second file as an output file, wherein the relationship is detected based on the classification of the first and second files.

14. The apparatus of claim 1, comprising a history module that records a first history of access to the first file and records a second history of access to the second file, wherein the relationship is detected based on the first and second histories.

15. A computer program product for grouping data, the computer program product comprising a computer readable storage medium having program instructions embodied therewith, the program instructions executable by a processor to cause the processor to:

detect a relationship between a first file and a second file;

calculate a degree of relevance between the first file and the second file based on the relationship;

group the first file and the second file in response to the degree of relevance being greater than a threshold degree of relevance; and store the first file and the second file on a tape cartridge, wherein storing the first file and the second file on the tape cartridge comprises:

determining that the first file satisfies a condition for migration to the tape cartridge;

determining that the first file is grouped with the second file in response to the degree of relevance being greater than the threshold degree of relevance; and storing the first file and the second file on the tape cartridge in response to determining that the first file is grouped with the second file, wherein the second file does not satisfy the condition for migration to the tape cartridge.

16. The computer program product of claim 15, wherein the program instructions executable by the processor cause the processor to detect the relationship between the first file and the second file in response to initiating migration of the first file.

17. The computer program product of claim 15, wherein the relationship between the first file and the second file is associated with performance of a task.

18. The computer program product of claim 15, wherein the degree of relevance is a directional degree of relevance.

* * * * *